(12) United States Patent
Chen et al.

(10) Patent No.: US 12,736,765 B2
(45) Date of Patent: Sep. 15, 2026

(54) OPTICAL FIBER CONNECTION BASE AND OPTICAL FIBER CONNECTION BASE MODULE

(71) Applicant: CLEVO CO., New Taipei City (TW)

(72) Inventors: Chien-Liang Chen, New Taipei City (TW); Wei-Cheng Li, Taipei City (TW); Hung-Chang Huang, New Taipei City (TW)

(73) Assignee: CLEVO CO., New Taipei City (TW)

( * ) Notice: Subject to any disclaimer, the term of this patent is extended or adjusted under 35 U.S.C. 154(b) by 315 days.

(21) Appl. No.: 18/677,057

(22) Filed: May 29, 2024

(65) Prior Publication Data

US 2025/0216633 A1 Jul. 3, 2025

(30) Foreign Application Priority Data

Dec. 29, 2023 (TW) ................................ 112214360

(51) Int. Cl.
*G02B 6/42* (2006.01)
*G02B 6/38* (2006.01)

(52) U.S. Cl.
CPC ......... *G02B 6/4292* (2013.01); *G02B 6/3831* (2013.01); *G02B 6/423* (2013.01)

(58) Field of Classification Search
CPC ...................................................... G02B 6/423
See application file for complete search history.

(56) References Cited

U.S. PATENT DOCUMENTS 6,302,570 B1 * 10/2001 Petell ...................... G09F 9/305 362/570
10,942,316 B1 * 3/2021 Feng .................... G02B 6/3839
2003/0147254 A1 * 8/2003 Yoneda ................ G02B 6/4298 362/555
2022/0003941 A1 * 1/2022 Bauco .................. G02B 6/3853

FOREIGN PATENT DOCUMENTS

JP 2000035526 A * 2/2000

* cited by examiner

*Primary Examiner* — Charlie Y Peng
(74) *Attorney, Agent, or Firm* — Li & Cai Intellectual Property Office

(57) ABSTRACT

An optical fiber connection base is provided, including a socket, a light emitting module, and an optical fiber bundle. The socket has an extension portion and a base having an accommodating space. The base is provided with an insertion hole and an alignment hole that are spatially communicated with each other. A first direction extends along the insertion hole. A side surface of the light emitting element of the light emitting module corresponds to the insertion hole, defining a light emitting surface. One end of the optical fiber bundle is inserted into the insertion hole in the first direction, such that a light receiving end is defined. The light receiving end is adjacent to the light emitting surface, and a center of a cross section of the light receiving end corresponds to a center of the light emitting surface.

10 Claims, 5 Drawing Sheets

12
2
11
13
D1
D2

11
2
12
100

OPTICAL FIBER CONNECTION BASE AND OPTICAL FIBER CONNECTION BASE MODULE

CROSS-REFERENCE TO RELATED PATENT APPLICATION

This application claims the benefit of priority to Taiwan Patent Application No. 112214360, filed on Dec. 29, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an optical fiber connection base, and more particularly to an optical fiber connector which can be applied to an optical fiber connector.

BACKGROUND OF THE DISCLOSURE

The optical fiber has the advantages of greater bandwidth and lower power loss, and has been widely used as a signal transmission medium in recent years.

In addition to the optical fiber connector, the socket also plays an important role in the optical fiber module. According to customer's requirements, the optical fiber connectors may be manufactured in different configurations, resulting in a variety of forms, and the same is true for the sockets cooperatively used with the optical fiber connectors.

In general, the volume of the optical fiber bundle varies with the operation temperature changes, such that the designed structure of the optical fiber connection base may not be able to adapt to the volume change, resulting in an unstable connection between the optical fiber bundle and the light emitting element (e.g., LED). Further, the efficiency of the optical fiber to receive the light emitted by the LED may be affected (e.g., brightness reduction), or a color shift may occur.

Therefore, how to improve the efficiency of the optical fiber connection base through structural design improvements to overcome the above issues has become one of the important issues to be addressed in the related field.

SUMMARY OF THE DISCLOSURE

In response to the above-referenced technical inadequacies, the present disclosure provides an optical fiber connection base and an optical fiber connection base module.

In order to solve the above-mentioned problems, one of the technical aspects adopted by the present disclosure is to provide an optical fiber connection base, which includes a socket, a light emitting module, and an optical fiber bundle. The socket has a base and an extension portion. The base has an accommodating space. The base is provided with an insertion hole and an alignment hole, and the insertion hole is spatially communicated with the alignment hole. The extension portion is connected to a side wall of the base, and one end of the extension portion is exposed from the base and provided with a locking hole. A first direction extending along the insertion hole is different from a second direction extending along the locking hole. The light emitting module is disposed in the accommodating space. The light emitting module includes a circuit substrate and a light emitting element, and the light emitting element is disposed on the circuit substrate. A top surface of the light emitting element is exposed from the alignment hole. A side surface of the light emitting element corresponds to the insertion hole and defines a light emitting surface. One end of the optical fiber bundle is inserted into the insertion hole of the base in the first direction, such that a light receiving end is defined. The light receiving end is adjacent to the light emitting surface, and a center of a cross section area of the light receiving end corresponds to a center of the light emitting surface.

In one of the possible or preferred embodiments, the cross section area of the light receiving end further covers a projection of the light emitting surface.

In one of the possible or preferred embodiments, the locking hole is oval shaped.

In one of the possible or preferred embodiments, the base has a body and a sleeve connected to the body, a port of the sleeve is the insertion hole, and the body has the alignment hole.

In one of the possible or preferred embodiments, an opening is provided in a wall of the sleeve.

In one of the possible or preferred embodiments, the body has two side walls and a top wall, the two side walls are respectively arranged on two sides of the top wall, the alignment hole is provided in the top wall, and the extension portion is connected to one of the two side walls.

In one of the possible or preferred embodiments, the body further has a hole, the hole is provided in the top wall and adjacent to the alignment hole. The light emitting module includes a plurality of electronic components disposed on the circuit substrate, and the plurality of electronic components are correspondingly exposed from the hole.

In one of the possible or preferred embodiments, the optical fiber connection base further includes another socket and another light emitting module. The another light emitting module is disposed in an accommodating space of the another socket, and another end of the optical fiber bundle is inserted into the another socket in the first direction.

In order to solve the above-mentioned problems, another one of the technical aspects adopted by the present disclosure is to provide an optical fiber connection base module, which includes the optical fiber connection base as described above, another socket, another light emitting module, and two connectors. The another light emitting module is disposed in an accommodating space of the another socket, and another end of the optical fiber bundle is inserted into the another socket in the first direction. Each of the two connectors is electrically connected to a corresponding one of the circuit substrate.

In one of the possible or preferred embodiments, the connector is a flat flexible cable connector or a flexible printed circuit connector.

Therefore, in the optical fiber connection base provided by the present disclosure, by virtue of "the structural design of the socket," "the one end of the optical fiber bundle being inserted into the insertion hole of the base in the first direction, such that the light receiving end is defined," and "the light receiving end being adjacent to the light emitting surface, and the center of the cross section area of the light receiving end corresponding to the center of the light emitting surface," a positional relationship between the light emitting element and the optical fiber bundle can be secured, and brightness of a light received by the light receiving from the light emitting element can be improved.

Further, according to one embodiment, by virtue of "the cross section area of the light receiving end further covering the projection of the light emitting surface," in addition to improving the brightness of the light received by the light receiving from the light emitting element, a problem of color shift due to a mixture of lights emitted by light emitting diodes can also be improved, so that luminescence of the light emitting diodes can be transmitted to the optical fiber bundle.

Further, according to one embodiment, by virtue of "the locking hole being oval shaped," a problem that a volume (i.e., a length) of the optical fiber bundle varies due to influence of temperature changes can be adopted.

Further, according to one embodiment, the socket is made of a rigid material, such as acrylic, to strengthen the structure of the socket.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
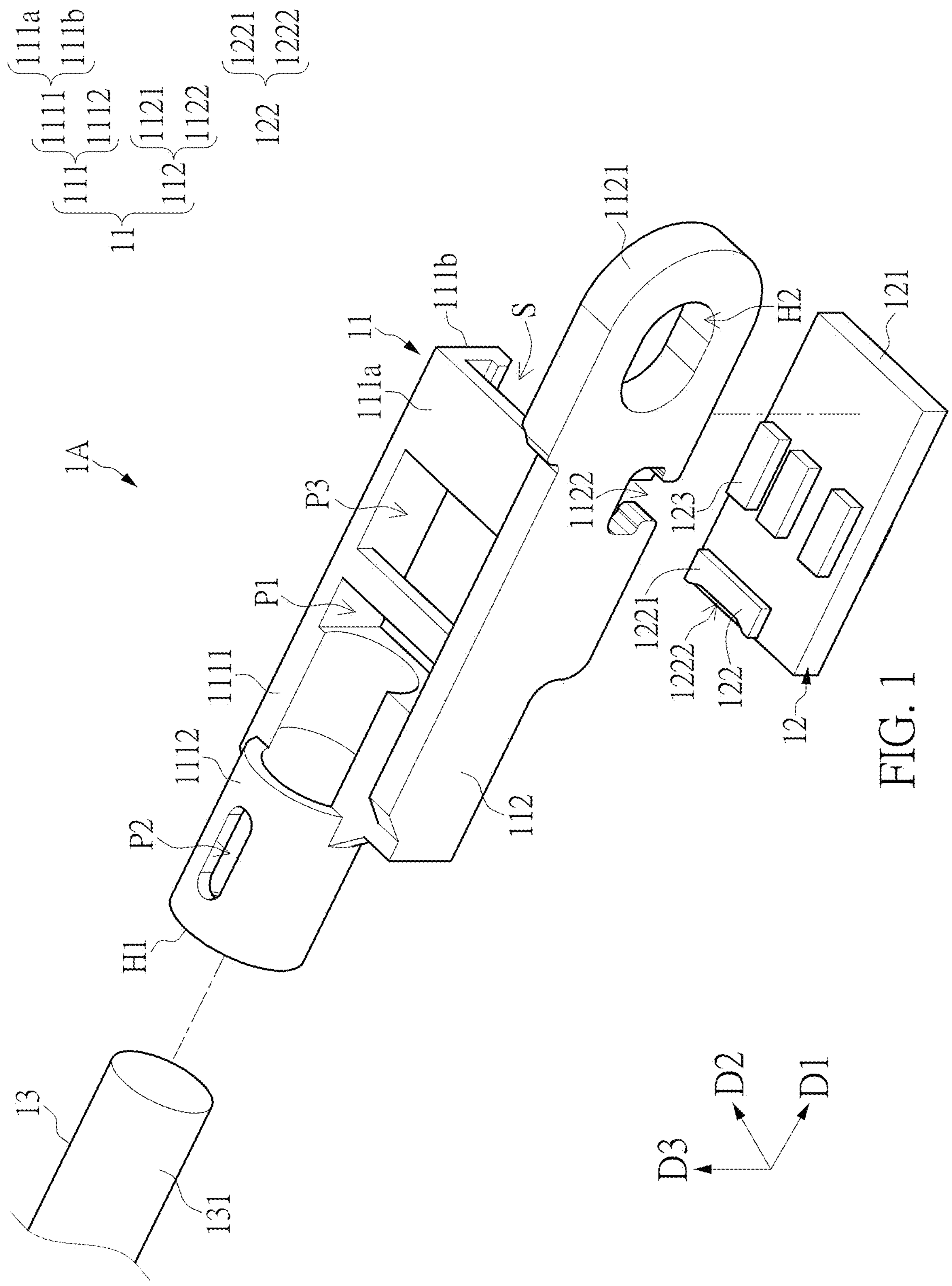
FIG. 1 is a partial schematic exploded view of an optical fiber connection base according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

EMBODIMENTS

Figure 2:
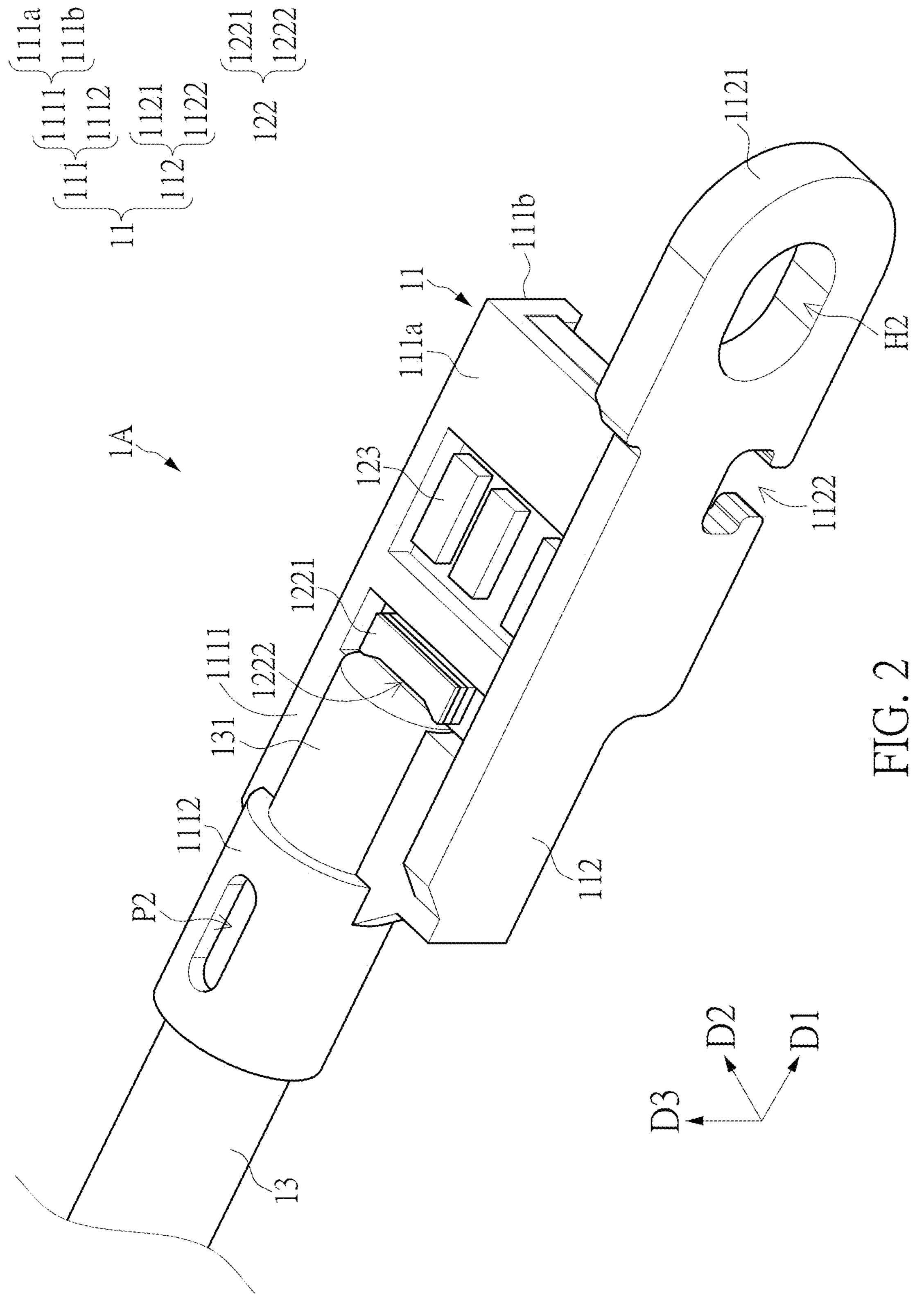
FIG. 2 is a view showing an assembly state of the embodiment shown in FIG. 1.
Figure 3:
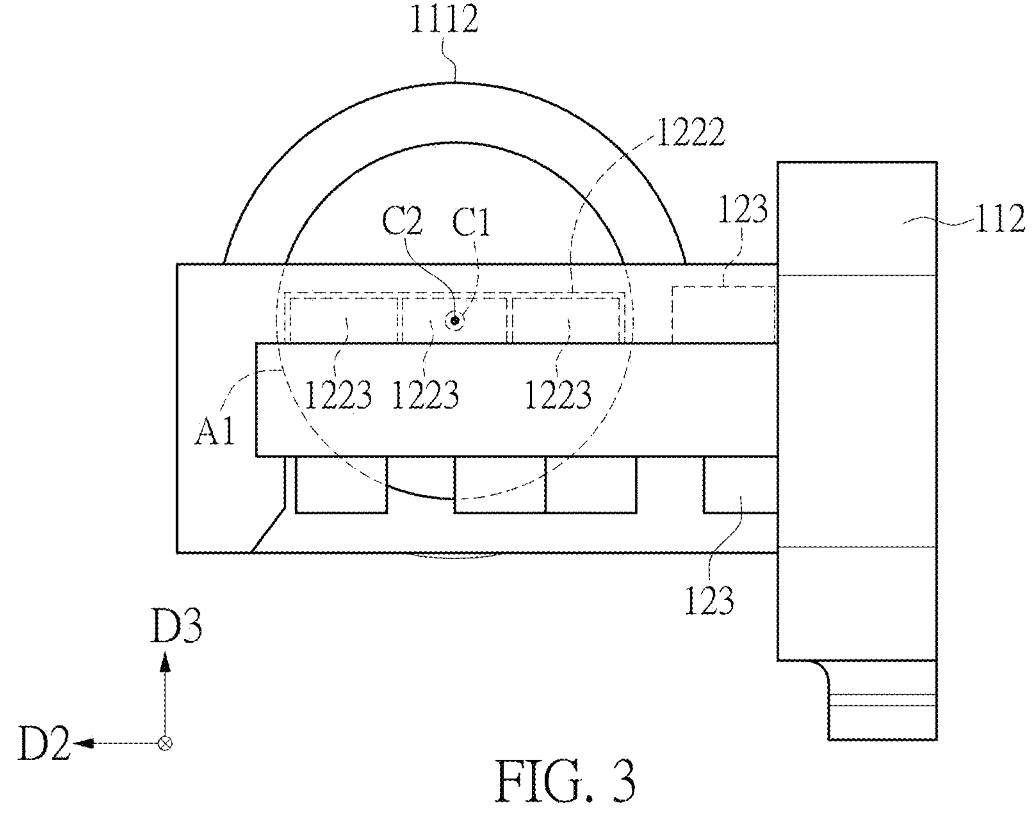
FIG. 3 is a schematic cross-sectional view of the embodiment shown in FIG. 2.

Reference is made to FIG. 1 to FIG. 3, in which FIG. 1 is a partial schematic exploded view of an optical fiber connection base according to one embodiment of the present disclosure, FIG. 2 is a view showing an assembly state of the embodiment shown in FIG. 1, and FIG. 3 is a schematic cross-sectional view of the embodiment shown in FIG. 2.

The optical fiber connection base 1A includes a socket 11, a light emitting module 12, and an optical fiber bundle 13. The socket 11 has a base 111 and an extension portion 112. The base 111 has an accommodating space S. The base 111 is also provided with an insertion hole H1 and an alignment hole P1, and the insertion hole H1 is spatially communicated with the alignment hole P1. The extension portion 112 is connected to a side of the base 111. An end 1121 of the extension portion 112 is exposed from the base 111 and provided with a locking hole H2. A first direction D1 extending along the insertion hole H1 is different form a second direction D2 extending along the locking hole H2. The light emitting module 12 is disposed in the accommodating space S. The light emitting module 12 includes a circuit substrate 121 and a light emitting element 122, and the light emitting element 122 is disposed on the circuit substrate 121. A top surface 1221 of the light emitting element 122 is exposed from the alignment hole P1, and a side surface of the light emitting element 122 defines a light emitting surface 1222, which corresponds to the insertion hole H1. One end of the optical fiber bundle 13 is inserted into the insertion hole H1 of the base 111 in the first direction D1, such that a light receiving end 131 is defined. The light receiving end 131 is adjacent to the light emitting surface 1222, and a center C1 of a cross section of the light receiving end 131 corresponds to a center C2 of the light emitting surface 1222.

The light emitting element 122 includes a plurality of light emitting diodes 1223, such as the light emitting diodes of the red, green, and blue primary colors. The light emitting surface 1222 of the light emitting element 122 is adjacent to the light receiving end 131 of the optical fiber bundle 13, i.e., the light emitting surface 1222 is immediately adjacent to the light receiving end 131 of the optical fiber bundle 13, so that there is no gap or a small gap between the light emitting surface 1222 and the optical fiber bundle 13. According to the embodiment shown in FIG. 1, the first direction D1 is perpendicular to the second direction D2, and a direction normal to the top surface 1221 of the light emitting element 122 is defined as a third direction D3. In the present embodiment, the third direction D3 is perpendicular to each of the first direction D1 and the second direction D2. The center C1 of the cross section of the light receiving end 131 of the optical fiber bundle 13 corresponds to the center C2 of the light emitting surface 1222, i.e., they are overlapped with each other along the first direction D1, so that brightness of a light can be evenly received by the light receiving end 131, and a problem of color shift due to a mixture of lights emitted by the plurality of light emitting diodes 1223 can be prevented. As shown in FIG. 3, in the present embodiment, a cross section area A1 of the light receiving end 131 also covers a projection of the light emitting surface 1222, whereby the brightness of the light received by the light receiving end 131 can be further improved (or the light can be concentrated), and the problem of color shift can be avoided (e.g., the light receiving end 131 may not receive the light emitted by the light emitting diodes 1223 arranged at an outer side).

As shown in FIG. 1 and FIG. 2, the extension portion 112 is a plate-like structure, and the locking hole H2 is oval shaped. The locking hole H2 is configured for being locked with a fixation element to fix the socket 11. During operation, the optical fiber bundle 13 generates operating temperature, which has an effect on a length of the optical fiber bundle 13, such as elongation or shortening of the optical fiber bundle 13 along the first direction D1. Therefore, by such structural design, the locking hole H2 can accept slight changes of the optical fiber bundle 13 along the first direction D1, while the socket 11 can be fixed correspondingly with respect to the second direction D2 and the third direction D3.

As shown in FIG. 1 and FIG. 2, the base 111 has a body 1111 and a sleeve 1112. The sleeve 1112 is connected to the body 1111, and a port of the sleeve 1112 is the insertion hole H1. The body 1111 has the alignment hole P1. The optical fiber bundle 13 is fixed in place through the sleeve 1112, and the light emitting element 122 is positioned through the alignment hole P1, whereby the light emitting surface 1222 can be ensured to face the light receiving end 131. In addition, in the present embodiment, an opening P2 is provided in a wall of the sleeve 1112. A manufacturer can dispense glue through the opening P2 to fix the optical fiber bundle 13 in the sleeve 1112. Specifically, the body 1111 has two side walls 111*b* and a top wall 111*a*, and the two side walls 111*b* are respectively arranged on two sides of the top wall 111*a*, thereby defining the accommodating space S. In the present embodiment, the alignment hole P1 is provided in the top wall 111*a*, and the extension portion 112 is connected to one side wall 111*b*.

According to the embodiment shown in FIG. 1 and FIG. 2, the body 1111 also has a hole P3. The hole P3 is provided in the top wall 111*a* and adjacent to the alignment hole P1. The light emitting element 12 includes a plurality of electronic components 123 disposed on the circuit substrate 121, and the plurality of electronic components 123 are correspondingly exposed from the hole P3.

Figure 4:
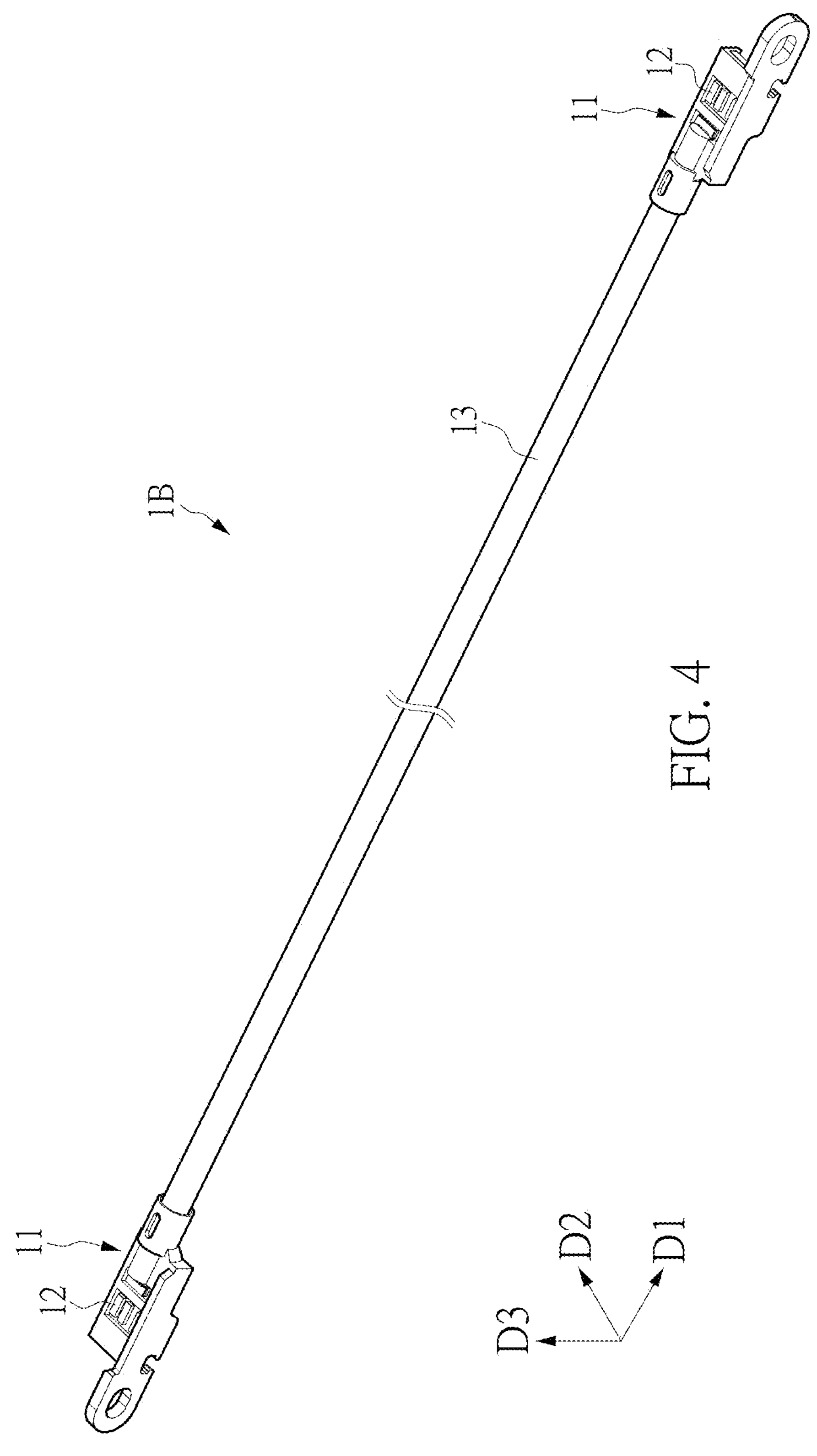
FIG. 4 is a schematic view of the optical fiber connection base according to another embodiment of the present disclosure.

Reference is made to FIG. 4, in which a schematic view of an optical fiber connection base 1B according to another embodiment of the present disclosure is shown. In the present embodiment, the optical fiber connection base 1B further includes another socket 11 and another light emitting module 12. The another light emitting module 12 is disposed in the another socket 11 (i.e., in another accommodating space S of the another socket 11), and another end of the optical fiber bundle 13 is inserted into the another socket 11 in the first direction D1.

Figure 5:
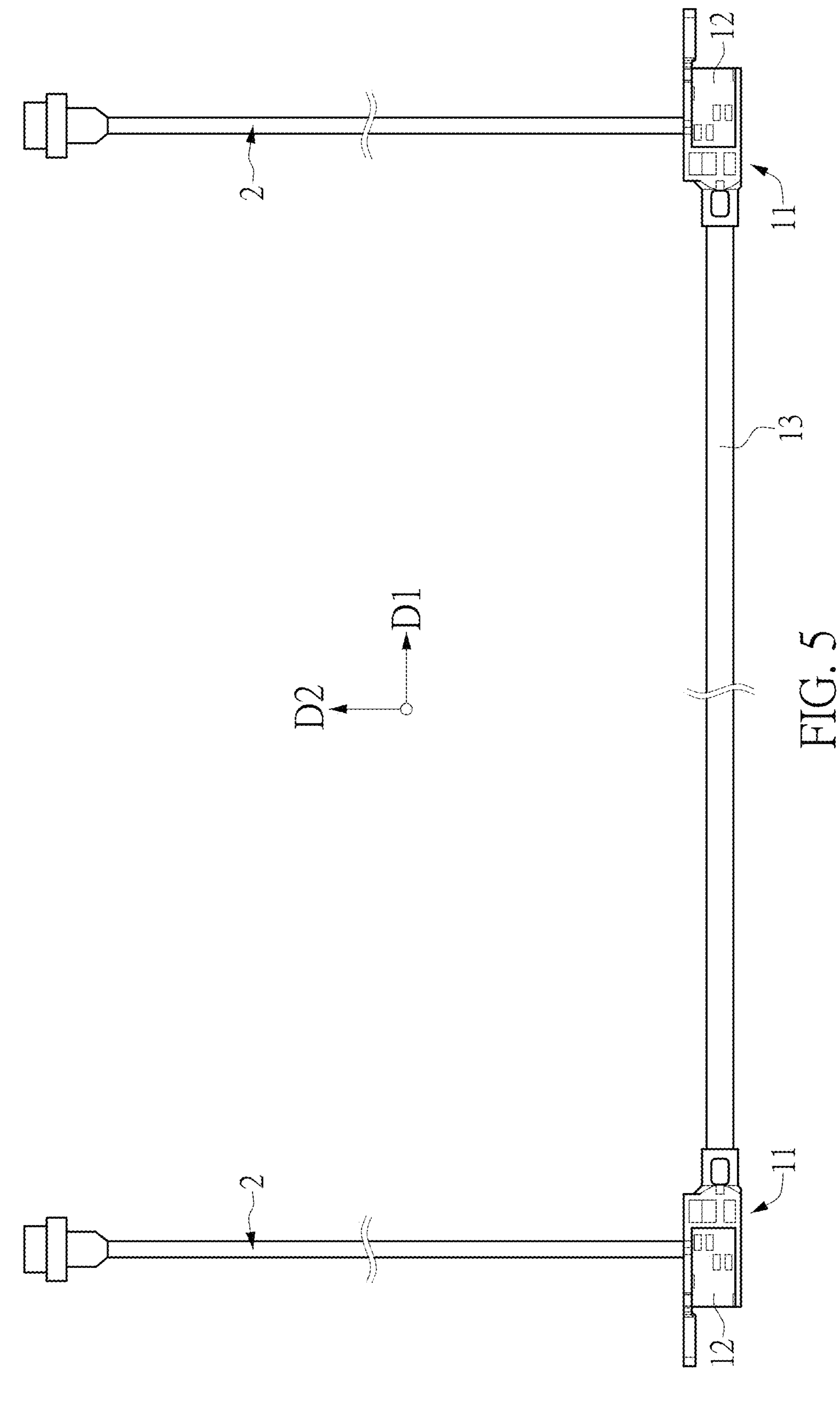
FIG. 5 is a schematic view of an optical fiber connection base module according to one embodiment of the present disclosure.

Reference is made to FIG. 5, in which a schematic view of an optical fiber connection base module 100 according to one embodiment of the present disclosure is shown. In the present embodiment, the optical fiber connection base module 100 includes the optical fiber connection base 1A, the another socket 11, the another light emitting module 12, and two connectors 2. The another light emitting module 12 is disposed in the another accommodating space S of the another socket 11, and the another end of the optical fiber bundle 13 is inserted to the another socket 11 in the first direction D1. The two connectors 2 are respectively and electrically connected to the circuit substrates 11. In the present embodiment, a wire of the connector 2 is soldered to the circuit substrate 121, and a part of the wire is fixed in a positioning hole 1122 (as shown in FIG. 2). In other words, one end of the wire is soldered to the circuit substrate 121 and another end of the wire extends through the positioning hole 1122. The connector 2 can be, but is not limited to, a flat flexible cable (FFC) connector. According to certain embodiments, the connector 2 can also be a flexible printed circuit (FPC) connector.

BENEFICIAL EFFECTS OF THE EMBODIMENTS

In conclusion, in the optical fiber connection base provided by the present disclosure, by virtue of "the structural design of the socket," "the one end of the optical fiber bundle being inserted into the insertion hole of the base in the first direction, such that the light receiving end is defined," and "the light receiving end being adjacent to the light emitting surface, and the center of the cross section area of the light receiving end corresponding to the center of the light emitting surface," a positional relationship between the light emitting element and the optical fiber bundle can be secured, and brightness of a light received by the light receiving from the light emitting element can be improved.

Further, according to one embodiment, by virtue of "the cross section area of the light receiving end further covering the projection of the light emitting surface," in addition to improving the brightness of the light received by the light receiving from the light emitting element, the problem of color shift due to the mixture of lights emitted by the light emitting diodes can also be improved, so that luminescence of the light emitting diodes can be transmitted to the optical fiber bundle.

Further, according to one embodiment, by virtue of "the locking hole being oval shaped," a problem that a volume (i.e., a length) of the optical fiber bundle varies due to influence of temperature changes can be adopted.

Further, according to one embodiment, the socket is made of a rigid material, such as acrylic, to strengthen the structure of the socket.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical fiber connection base, comprising:

a socket having:

a base having an accommodating space; wherein the base is provided with an insertion hole and an alignment hole, and the insertion hole is spatially communicated with the alignment hole; and an extension portion connected to a side wall of the base; wherein one end of the extension portion is exposed from the base and provided with a locking hole;

wherein a first direction extending along the insertion hole is different from a second direction extending along the locking hole;

a light emitting module disposed in the accommodating space; wherein the light emitting module includes a circuit substrate and a light emitting element, the light emitting element is disposed on the circuit substrate, and a top surface of the light emitting element is exposed from the alignment hole; wherein a side surface of the light emitting element defines a light emitting surface, and the light emitting surface corresponds to the insertion hole; and an optical fiber bundle, one end of the optical fiber bundle being inserted into the insertion hole of the base in the first direction, such that a light receiving end is defined; wherein the light receiving end is adjacent to the light emitting surface, and a center of a cross section area of the light receiving end corresponds to a center of the light emitting surface.

2. The optical fiber connection base according to claim 1, wherein the cross section area of the light receiving end further covers a projection of the light emitting surface.

3. The optical fiber connection base according to claim 1, wherein the locking hole is oval shaped.

4. The optical fiber connection base according to claim 1, wherein the base has a body and a sleeve connected to the body, a port of the sleeve is the insertion hole, and the body has the alignment hole.

5. The optical fiber connection base according to claim 4, wherein an opening is provided in a wall of the sleeve.

6. The optical fiber connection base according to claim 4, wherein the body has two side walls and a wall of the top surface, the two side walls are respectively arranged on two sides of the wall of the top surface, the alignment hole is provided in the wall of the top surface, and the extension portion is connected to one of the two side walls.

7. The optical fiber connection base according to claim 6, wherein the body further has a hole, the hole is provided in the wall of the top surface and adjacent to the alignment hole; wherein the light emitting module includes a plurality of electronic components disposed on the circuit substrate, and the plurality of electronic components are correspondingly exposed from the hole.

8. The optical fiber connection base according to claim 1, further comprising another socket and another light emitting module; wherein the another light emitting module is disposed in an accommodating space of the another socket, and another end of the optical fiber bundle is inserted into the another socket in the first direction.

9. An optical fiber connection base module, comprising:

the optical fiber connection base as claimed in claim 1;

another socket and another light emitting module, wherein the another light emitting module is disposed in an accommodating space of the another socket, and another end of the optical fiber bundle is inserted into the another socket in the first direction; and two connectors each electrically connected to a corresponding one of the circuit substrate.

10. The optical fiber connection base module according to claim 9, wherein the connector is a flat flexible cable connector or a flexible printed circuit connector.

* * * * *